(12) United States Patent
Sorze

(10) Patent No.: US 6,776,065 B2
(45) Date of Patent: Aug. 17, 2004

(54) LOCKABLE ELASTIC JOINT FOR ANTHROPOMORPHOUS ROBOT SERVING INDUSTRIAL MACHINES, PARTICULARLY FOR SHEET METAL MACHINING MACHINES

(75) Inventor: Fabio Sorze, Lendinara (IT)

(73) Assignee: Salvagnini Italia S.p.A. (IT)

( * ) Notice: Subject to any disclaimer, the term of this patent is extended or adjusted under 35 U.S.C. 154(b) by 246 days.

(21) Appl. No.: 10/071,672

(22) Filed: Feb. 8, 2002

(65) Prior Publication Data

US 2002/0110417 A1 Aug. 15, 2002

(30) Foreign Application Priority Data

Feb. 9, 2001 (IT) ...................................... MI2001A0262

(51) Int. Cl.[7] .............................................. B25J 17/00
(52) U.S. Cl. .............................. 74/490.05; 74/490.08; 901/45
(58) Field of Search ......................... 74/490.01, 490.05, 74/490.06, 490.08, 490.13; 33/644; 414/735, 751.1; 901/45

(56) References Cited

U.S. PATENT DOCUMENTS

| | | | | |
|---|---|---|---|---|
| 4,098,001 A | * | 7/1978 | Watson ........................ 33/644 |
| 4,155,169 A | * | 5/1979 | Drake et al. ................... 33/644 |
| 4,283,153 A | * | 8/1981 | Brendamour ................. 403/53 |
| 4,595,334 A | * | 6/1986 | Sharon ........................ 414/735 |
| 4,702,667 A | * | 10/1987 | Hounsfield et al. ......... 414/735 |
| 4,720,923 A | * | 1/1988 | Quinton et al. ............... 33/644 |
| 4,800,802 A | * | 1/1989 | Rebman ......................... 92/61 |
| 4,820,114 A | | 4/1989 | Inaba et al. |
| 4,896,431 A | * | 1/1990 | Danmoto et al. ............. 33/644 |
| 5,396,714 A | * | 3/1995 | Sturges et al. ................ 33/644 |

FOREIGN PATENT DOCUMENTS

JP          63-57128     *   3/1988

* cited by examiner

Primary Examiner—William C. Joyce
(74) Attorney, Agent, or Firm—Akerman Senterfitt

(57) ABSTRACT

A lockable elastic joint for anthropomorphous robot with a wrist and a handling organ, having a first part that is fastenable to the wrist of the robot and a second part that is fastenable to the handling organ of the robot. A first coupling is provided between the parts that is suitable to maintain the same parts at a pre-set distance and on planes parallel to each other and a second coupling is provided between the parts to allow in an elastic way or, as an alternative, to prevent mutual movements of the parts along two directions parallel to the planes of the two parts and perpendicular to each other and around an axis perpendicular to the aforesaid planes. Locking elastic joints may be provided that are suitable to lock the two parts to each other in any position, where one part is decentralized from the other.

6 Claims, 11 Drawing Sheets

LOCKABLE ELASTIC JOINT FOR ANTHROPOMORPHOUS ROBOT SERVING INDUSTRIAL MACHINES, PARTICULARLY FOR SHEET METAL MACHINING MACHINES

FIELD OF THE INVENTION

The present invention concerns a lockable elastic joint for anthropomorphous robot serving industrial machines, particularly for sheet metal machining machines and even more particularly for bending machines.

BACKGROUND OF THE INVENTION

By the term "anthropomorphous robot" a robot for industrial machines is meant that has the ability to execute all the movements of a human arm, and in particular those of the articulations of elbow and wrist.

Anthropomorphous robots are increasingly used in the industry in order to replace the human intervention on machines of various kind, in particular for the loading and the unloading of the pieces being machined.

An example of this use is given by the machines for the machining of sheet metal and in particular by bending presses, where it has the task of handing the sheet metal to be bent, to accompany it in its movements during the bending stage and finally to remove it from the machine once the bending has been made.

The problem with robots used in this way consists in the fact that a robot is provided by its own nature with precise movements that are pre-set during the programming stage, while the part of sheet metal submitted to bending has a movement that varies both with the type of bending as well as with the nature and the thickness of the sheet metal.

Therefore it has been demonstrated to be necessary to interpose an elastic joint that is lockable on command between the wrist and the handling organ or hand of the robot, that allows the robot to accompany gently and with flexibility the movement of the sheet metal during the bending stage, while at the same time maintaining the precision of movement during the stage of loading and unloading of the sheet metal.

In view of this state of the art object of the present invention has been to provide a lockable elastic joint that is particularly suitable for the aforementioned use.

BRIEF SUMMARY OF THE INVENTION

According to the present invention such object has been reached by means of an elastic lockable joint for anthropomorphous robot provided with wrist and with handling organ, comprising a first part that is fastenable to the wrist of the robot and a second part that is fastenable to the handling organ of the robot, characterised in that it comprises first coupling means between said parts suitable to maintain the same parts at a pre-established distance and on planes parallel to each other and second coupling means between said parts suitable to allow in an elastic way or, as an alternative, to prevent mutual movements of said parts along two directions parallel to the planes of the two parts and perpendicular to each other and around an axis perpendicular to the aforesaid planes.

In this way the two parts are allowed to move elastically with respect to one another while maintaining the co-planarity and the mutual distance, as required in order to gently accompany the movements of the sheet metal during the bending stage. At the same time their mutual locking in a fixed position is possible, as required during the stages of loading and unloading of the sheet metal.

In addition there are preferably provided means suitable to lock the two parts in any position decentralised with respect to one another.

DETAILED DESCRIPTION OF THE DRAWINGS

These and other characteristics of the present invention will become evident from the following detailed description of an embodiment thereof that is illustrated as a non-limiting example in the enclosed drawings, in which:

FIG. 4 shows the aforesaid joint in section according to the line IV—IV in FIG. 2;

FIG. 5 shows the aforesaid joint in section according to the line V—V in FIG. 3;

Figure 1:
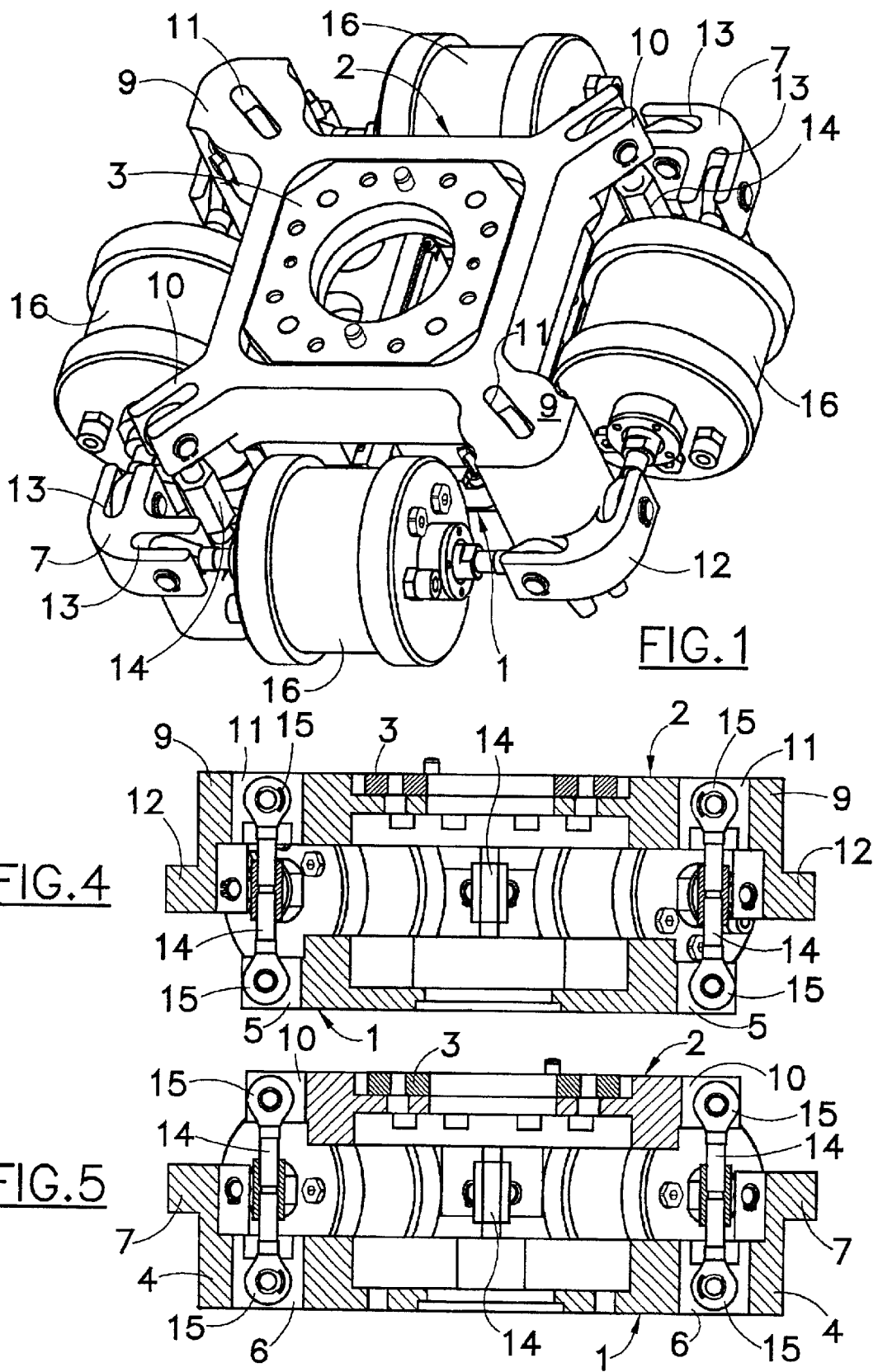
FIG. 1 shows in perspective view a lockable elastic joint for anthropomorphous robot according to the present invention.

The lockable elastic joint illustrated in FIGS. 1–9 comprises a first part 1 with essentially square plane shape (FIG. 3) destined to be fastened to the wrist of an anthropomorphous robot and therefore called also fixed element of the joint and a second part 2, also with essentially square plane shape (FIGS. 1 and 2) destined to be fastened to the handling organ of the robot through a disk 3 and therefore also called mobile element of the joint.

The fixed part 1 provides two pairs of radial extensions 4 and 5 in correspondence of its opposite vertexes. The radial extensions 4 have a central radial slot 6 and they end with an additional transversal arched extension 7 provided with longitudinal terminal slots 8. The radial extensions 5 are in turn shaped as a fork with intermediate radial slot.

The mobile part 2 is substantially symmetrical and rotated by 90° as regards the fixed part 1 and it therefore provides two pairs of radial extensions 9 and 10 too in correspondence of its opposite vertexes. The radial extensions 9 provide a central radial slot 11 and they end with an additional transversal arched extension 12 provided with longitudinal terminal slots 13. The radial extensions 10 are in turn shaped as a fork with radial intermediate slot.

The two parts 1 and 2 are kept parallel to each other at a pre-set distance owing to small connecting rods 14 with spherical articulation that extend perpendicularly to the lying planes of the two parts 1 and 2 and they have terminal heads 15 one hinged into a fork-shaped radial extension 5 of the fixed part 1 and the other one into the central slot 11 of the radial extension 9 of the mobile part 2 over it (FIG. 4), or vice versa one into the central slot 6 of a radial extension 4 of the fixed part 1 and the other one into the fork-shaped radial extension 10 of the mobile part 2 over it (FIG. 5).

The two parts 1 and 2 are in addition coupled in such a way so as to allow, or as an alternative to prevent, the mobile part 2 to move elastically as regards the fixed part 1 in directions parallel to the lying planes of the two parts and perpendicular to each other and around an axis of rotation perpendicular to the planes of the two parts. This is obtained owing to the pneumatic cylinders 16 that extend parallel to the two parts 1 and 2 between the arched extensions 7 of the fixed part 1 and the corresponding arched extensions 12 of the mobile part and vice versa (FIGS. 1–3 and 6). As it will better be seen later, the cylinders 16 have the double function of elastic coupling or rigid locking according to whether they are fed with air at medium or high pressure.

Figure 7:
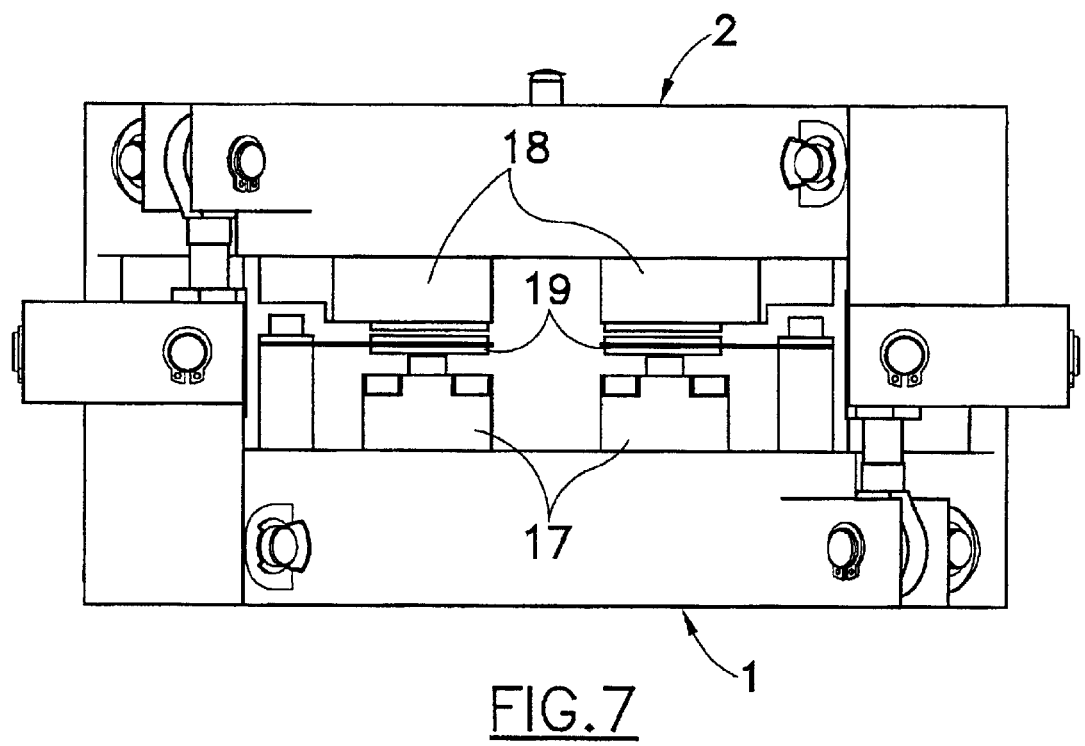
FIG. 7 shows a front view similar to the one in FIG. 6 but with peripheral parts removed in order to show the inside of the joint.
Figure 8:
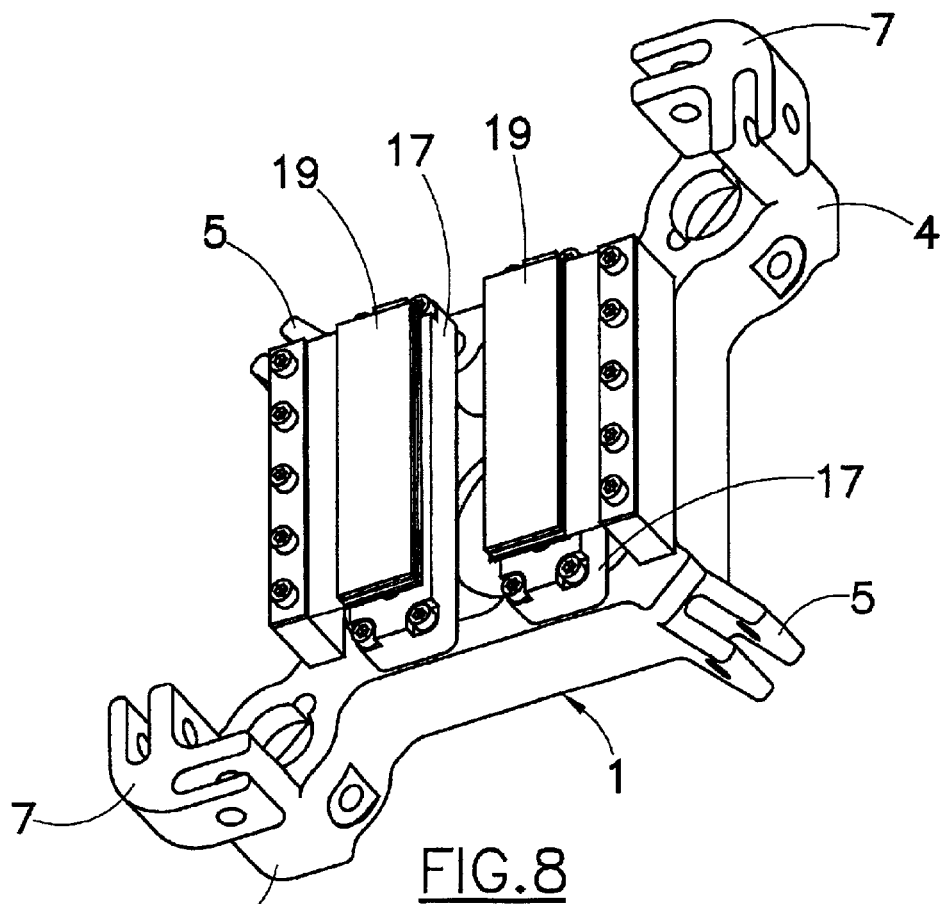
FIGS. 8 and 9 show the unit in FIG. 7 as divided into two parts turned over in opposite senses.
Figure 9:
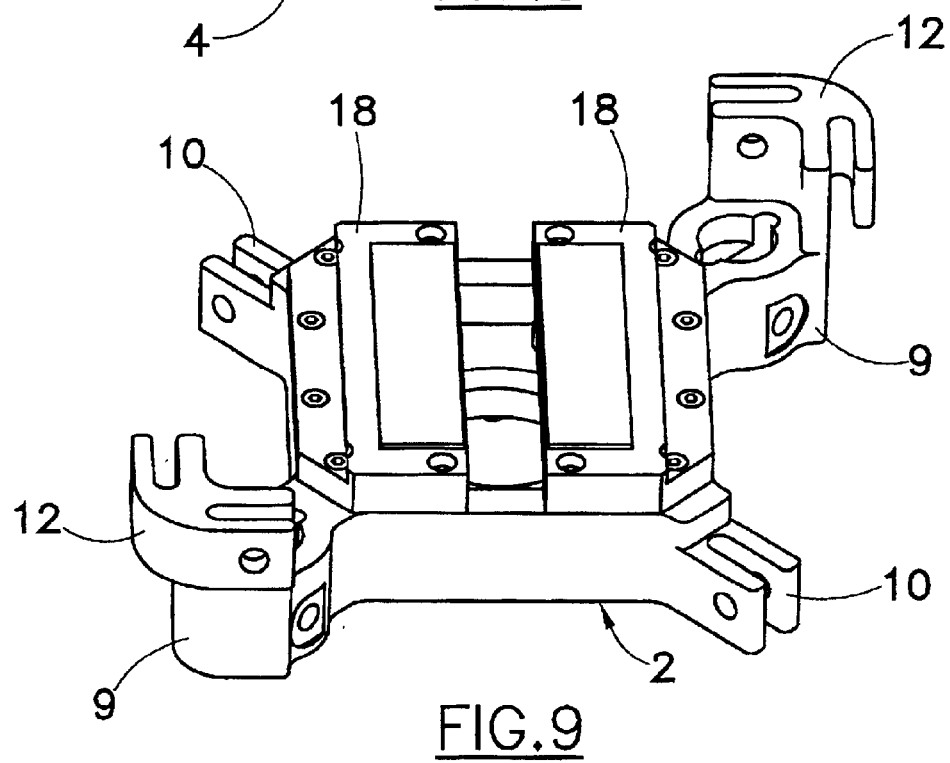

In addition it is possible to provide for the mutual locking of the two parts in any decentralised position using to such purpose pneumatic cylinders 17 fastened to the fixed part 1 and pads 18 fastened to the mobile part 2 with interposition of flexible stabilising plates 19 that are also fastened to the fixed part 1 (FIGS. 7–9).

In this way, while the two parts 1 and 2 maintain their condition of fixed distance parallelism, by introducing air at medium pressure in the cylinders 16 and by maintaining the cylinders 17 at rest it is possible to leave to the mobile part 2, and therefore to the handling organ of the robot, the possibility to move elastically in two perpendicular directions and to rotate as regards the fixed part 1, and therefore to the wrist of the robot, as required in order to gently follow the movement of the sheet metal during the bending stage of the sheet metal itself.

By introducing instead air at high pressure into the cylinders 16, the cylinders themselves lock the two parts 1 and 2 to each other, and therefore the handling organ as regards the wrist of the robot, as required in order to effect the operations of loading and unloading of the sheet metal with precision.

By introducing air at high pressure into the cylinders 17 of the fixed part 1 it is finally possible to lock the two parts 1 and 2 to each other in any position decentralised previously reached. The extension of the cylinders 17 causes in fact the bending of the stabilising plates 19 against the pads 18 of the mobile part 2 with the consequent locking of their mutual movement due to friction. The use of the stabilising plates 19 makes a rigid and clearance-free locking possible.

Figure 10:
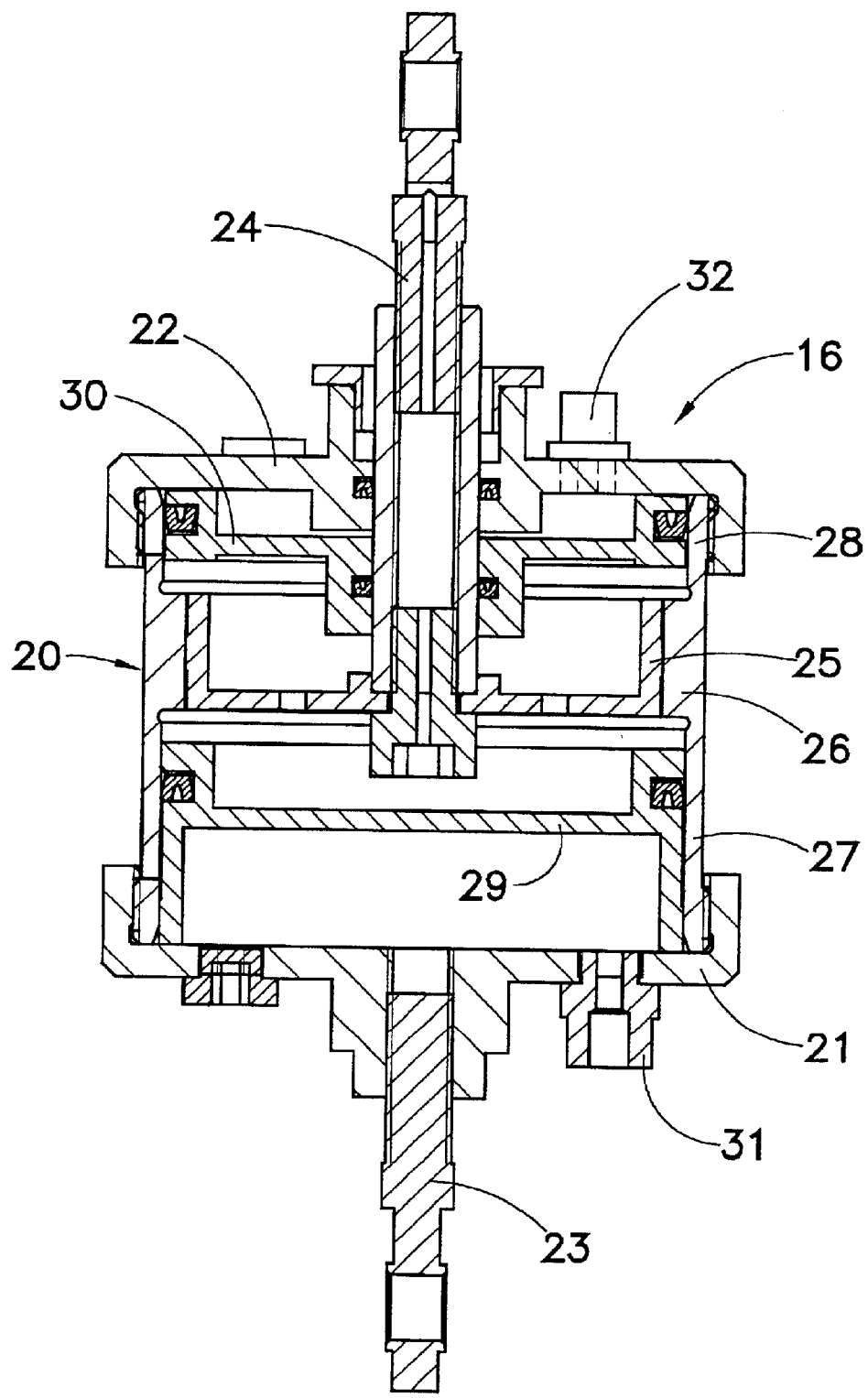
FIG. 10 shows in axial section a first example of pneumatic cylinder usable to provide the elastic movement and the locking of the two parallel parts of the joint according to the invention.
Figure 11:
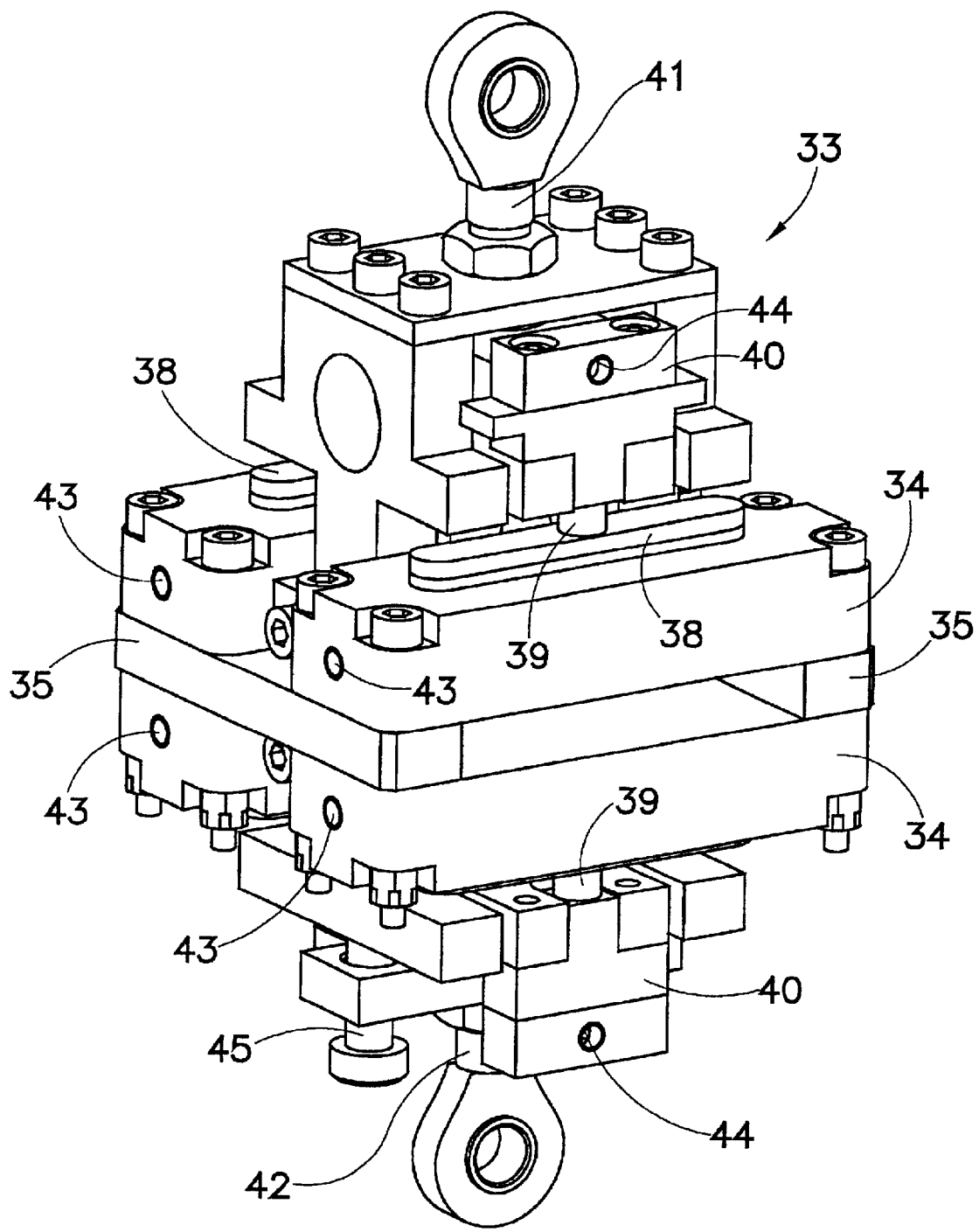
FIG. 11 shows in perspective view a second example of pneumatic cylinder usable to provide the elastic movement and the locking of the two parallel parts of the joint according to the invention.
Figure 12:
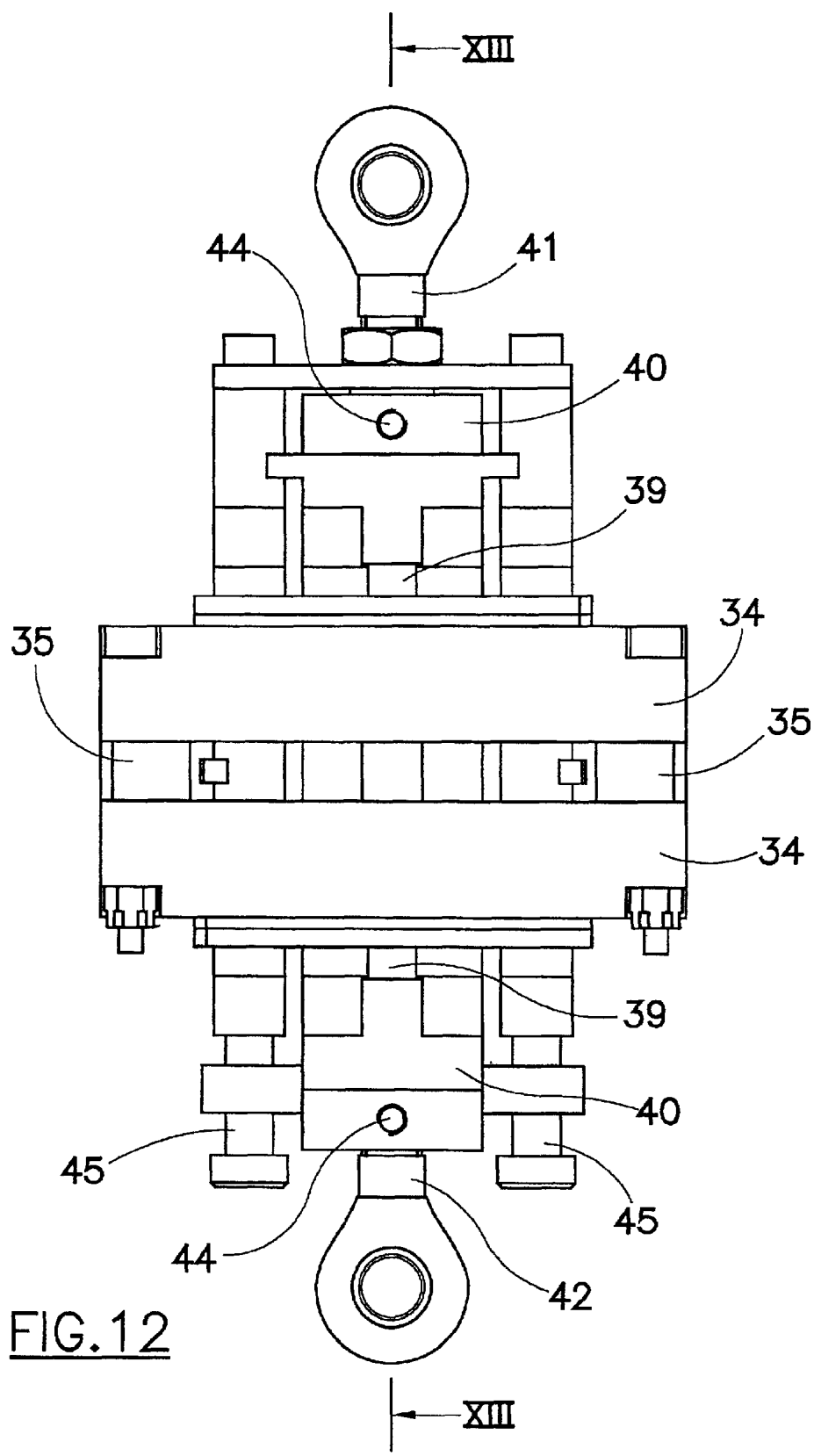
FIG. 12 shows the same cylinder in front view.
Figure 13:
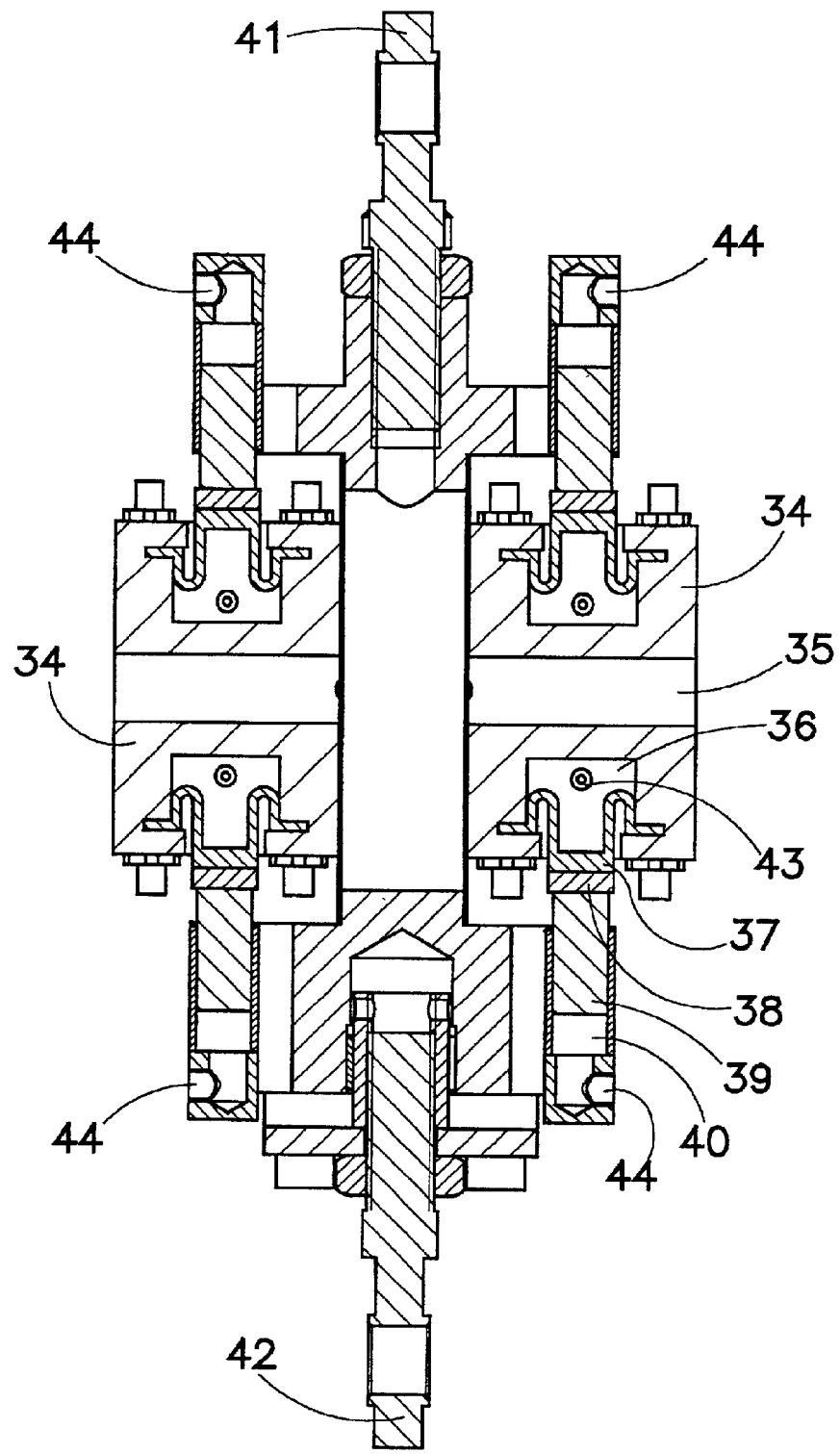
FIG. 13 shows the same cylinder in section according to the line XIII—XIII in FIG. 12.
Figure 14:
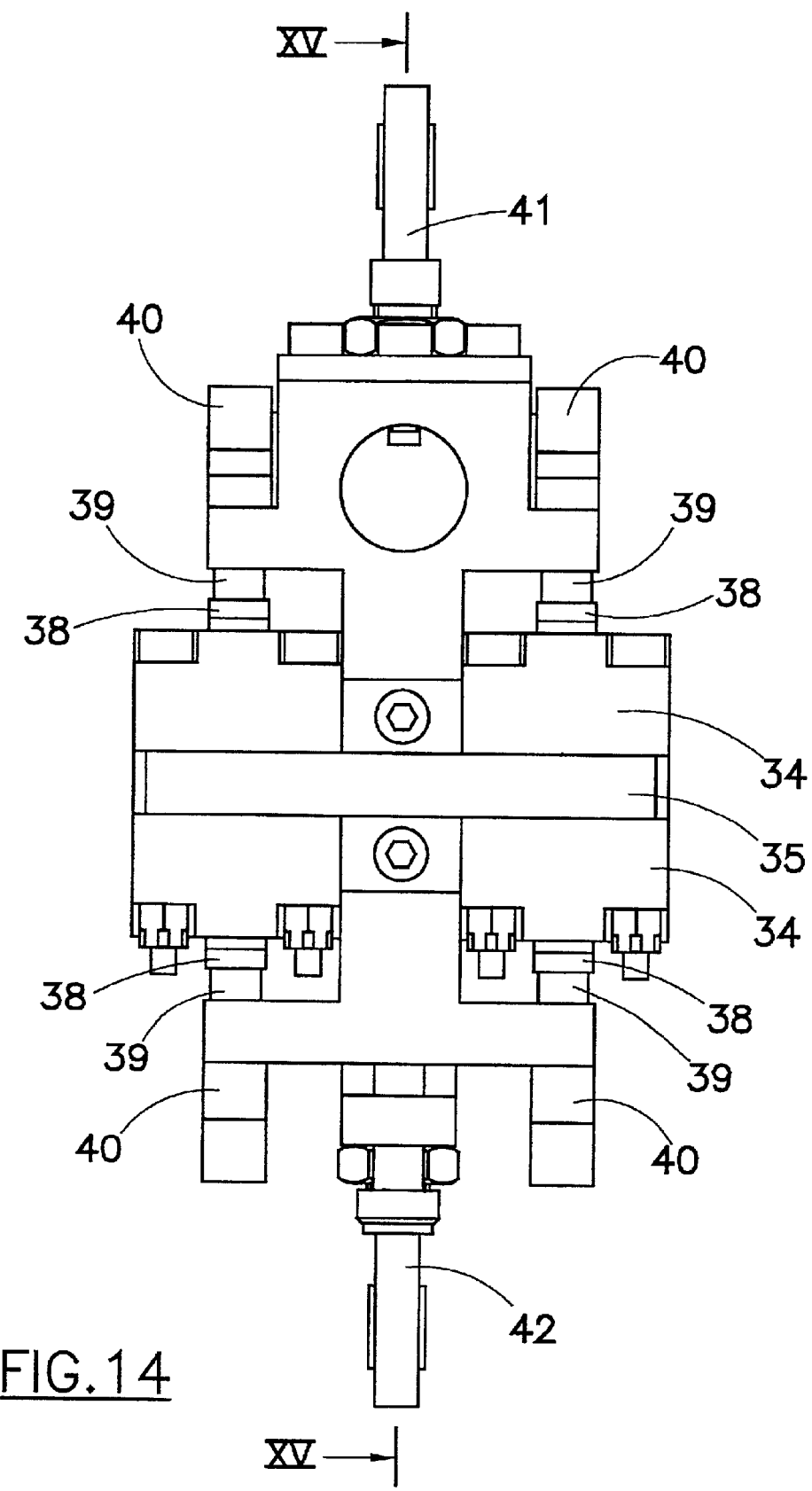
FIG. 14 shows the same cylinder in side view.
Figure 15:
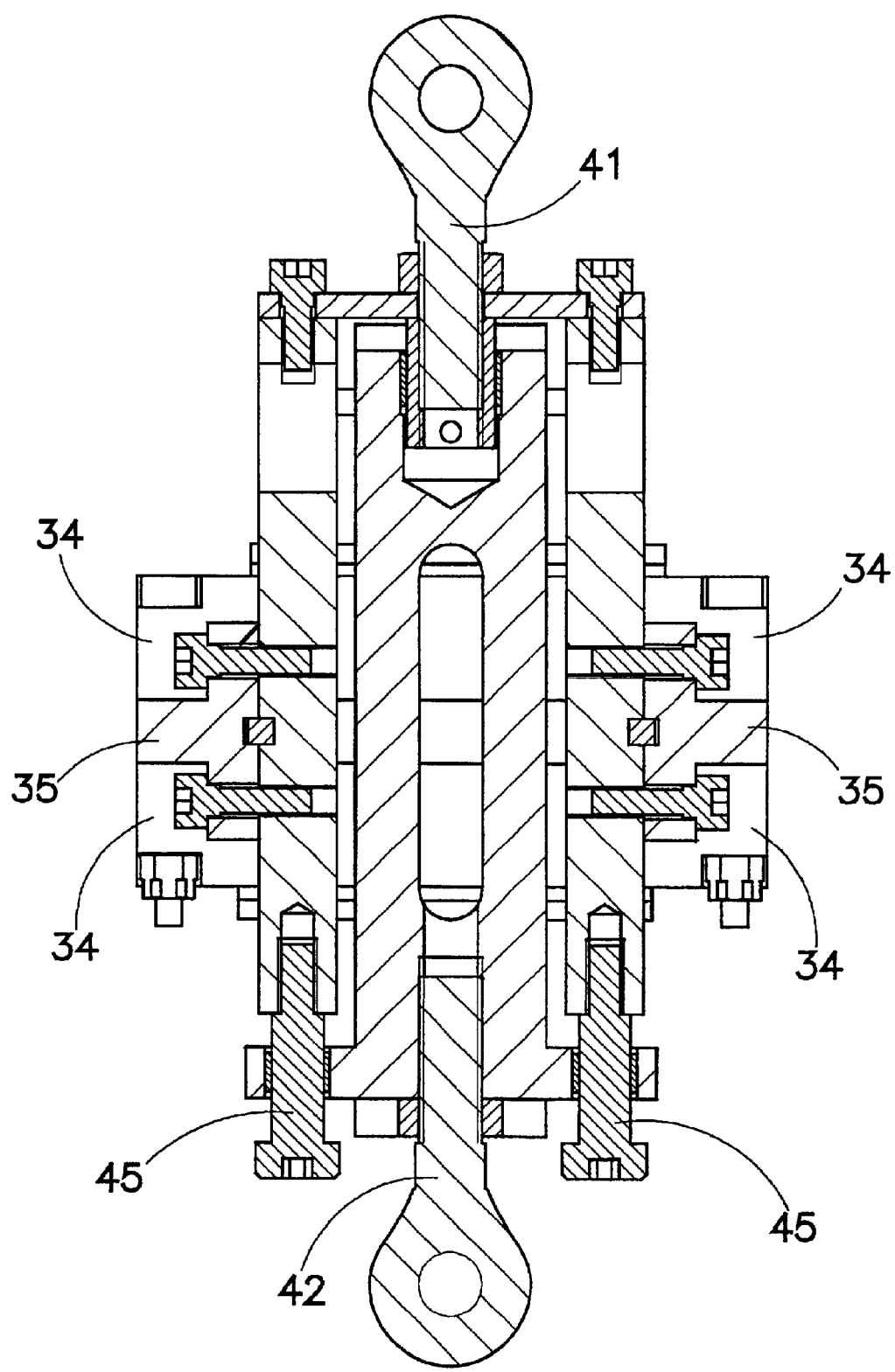
FIG. 15 shows the same cylinder in section according to the line XV—XV in FIG. 14.

In FIG. 10 an example of pneumatic cylinder 16 usable as described above with reference to FIGS. 1–6 is shown.

The cylinder 16 comprises a cylindrical casing 20 that is closed at its ends by two ring nuts 21 and 22 screwed on, to the first one of which a fixed in an axially sliding way. To the inside end of the stem 24 a sliding block 25 is fastened that is housed in a sliding way in a central narrow portion 26 of the inside chamber of the casing 20. Inside widened end portions 27 and 28 of the same chamber two pistons 29 and 30 are also slidingly housed which move as a function of the air pressure being fed through respective inlets 31 and 32.

If air at high pressure is supplied, the two pistons 29 and 30 move one toward the other until they get in abutment against the central narrow portion 26 of the inside chamber of the casing 20 and thus stop the movement of the sliding block 25. The mobile stem 24 gets therefore locked as regards the fixed stem 23.

If instead air at medium pressure is fed, the mobile sliding block 25 is held back between the two pistons 29 and 30 with a strength proportional to the feeding pressure. An elastic shifting from the central position as a function of the strength being applied to the mobile stem 24 is thus possible. The degree of elasticity depends on the feeding pressure of the air, which can be adequately adjusted by means of valve with control software.

In this embodiment the same pistons 29 and 30 thus operate as locking pistons and as elasticity pistons according to the air pressure being fed to the same pistons.

DETAILED DESCRIPTION OF THE INVENTION

As an alternative to the cylinder 16 in FIG. 10 it is possible to use the pneumatic cylinder 33 in FIGS. 11–15.

In this case two pairs of parallelepiped blocks 34 with spacers 35 interposed define within themselves respective cylinders 36 (a single one shown in FIG. 13) closed by flexible membranes 37 with ends stiffened by small plates 38 constrained to the respective membranes. These membrane cylinders are fastened to the fixed stem 41 and small pistons 39 operate on them that are fastened to the mobile stem 42 and sliding within cylinders 40 fastened to the fixed stem 41. The cylinders 36 are fed with air at high pressure through inlets 43, while the cylinders 40 are fed with air at medium pressure through inlets 44. Two cylindrical small bars 45 drive the movement of the mobile stem 42 as regards the fixed stem 41.

When air at high pressure is fed to the cylinders 36, the membranes 37 provide to the locking of the two stems of the cylinder 33 in central position. When air at medium pressure is instead fed inside the cylinders 40, the two stems 41 and 42 can move one as regards the other with a certain elasticity dependent on the pressure of feeding, which however tends to take them again in central position.

In this embodiment, evidently, the locking pistons (37) are distinct from the elasticity pistons (39).

What is claimed is:

1. A lockable elastic joint for an anthropamorphous robot provided with a wrist and a handling organ, comprising a first part fastenable to the wrist of the robot and a second part fastenable to the handling organ of the robot, said joint comprising:

a first coupling means between said parts that are suitable to maintain the same parts at a pre-set distance and on planes parallel to each other, and second coupling means between said parts suitable to allow in an elastic way or, as an alternative, to prevent mutual movements of said parts along two directions parallel to the planes of the two parts and and around an axis perpendicular to the aforesaid planes;

wherein said first and second parts have essentially a plane square shape with radial extensions and said first coupling means are made up of spherical articulation connecting rods that extend perpendicular to the lying planes of the two parts and are hinged, each one into radial extensions of said parts over them; and wherein said second coupling means are made up of fluid-mechanic cylinders that extend parallel the lying planes of the two parts and are interposed, each one, between adjacent radial extensions of said parts.

2. Lockable elastic joint according to claim 1, wherein said fluid-mechanic cylinders are fed with fluid at high pressure that locks them in central position or as an alternative with fluid at medium pressure that yieldingly thrusts them in said central position.

3. Lockable elastic joint according to claim 1, wherein said fluid-mechanic cylinders comprise pistons operating from opposite sides on a sliding block that is fastened to one of two terminal stems of the fluid-mechanic cylinder, means being provided to alternatively submit said pistons to fluid at high and at medium pressure in order to lock and, respectively, to allow the elastic movement of said sliding block.

4. Lockable elastic joint according to claim 1, wherein said fluid-mechanic cylinders comprise flexible membranes and pistons that are alternatively subjectable to fluid at high and at medium pressure in order to lock and, respectively, to allow the mutual elastic movement of terminal stems of the fluid-mechanic cylinder.

5. Lockable elastic joint according to claim 1, wherein said joint comprises locking means that are suitable to lock the two parts to each other in any decentralised position the one with respect to the other.

6. Lockable elastic joint according to claim 5, wherein said locking means comprises fluid-mechanic cylinders that are fastened to one of said parts and pads that are fastened to the other one of said parts by interposition of small flexible stabilising plates.

* * * * *

UNITED STATES PATENT AND TRADEMARK OFFICE
CERTIFICATE OF CORRECTION

PATENT NO. : 6,776,065 B2
APPLICATION NO. : 10/071672
DATED : August 17, 2004
INVENTOR(S) : Sorze It is certified that error appears in the above-identified patent and that said Letters Patent is hereby corrected as shown below:

Column 2, line 5, replace "decentralised" with -- decentralized--

Figure 2:
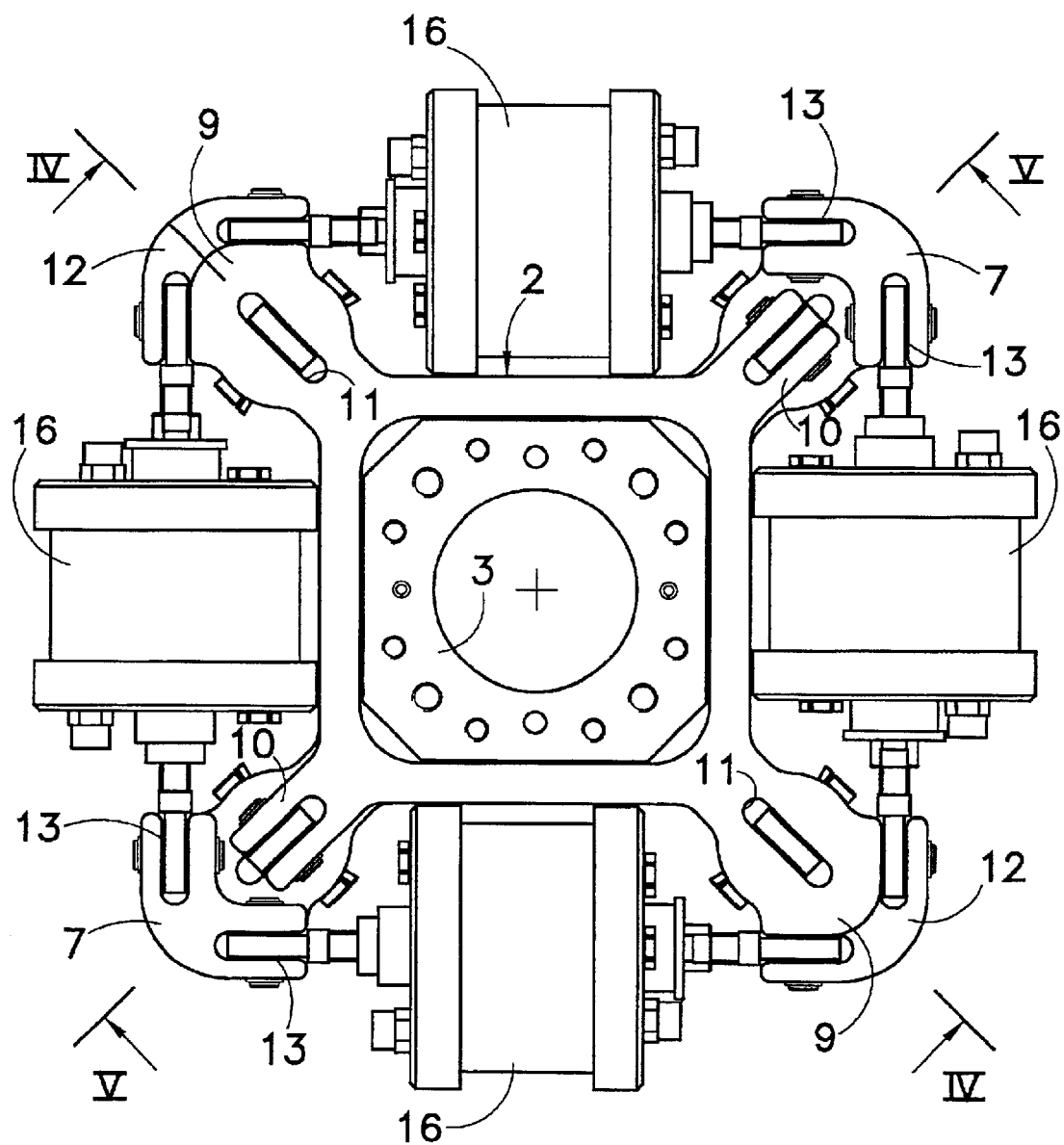
FIG. 2 shows the aforesaid joint in top plan as regards FIG. 1.
Figure 3:
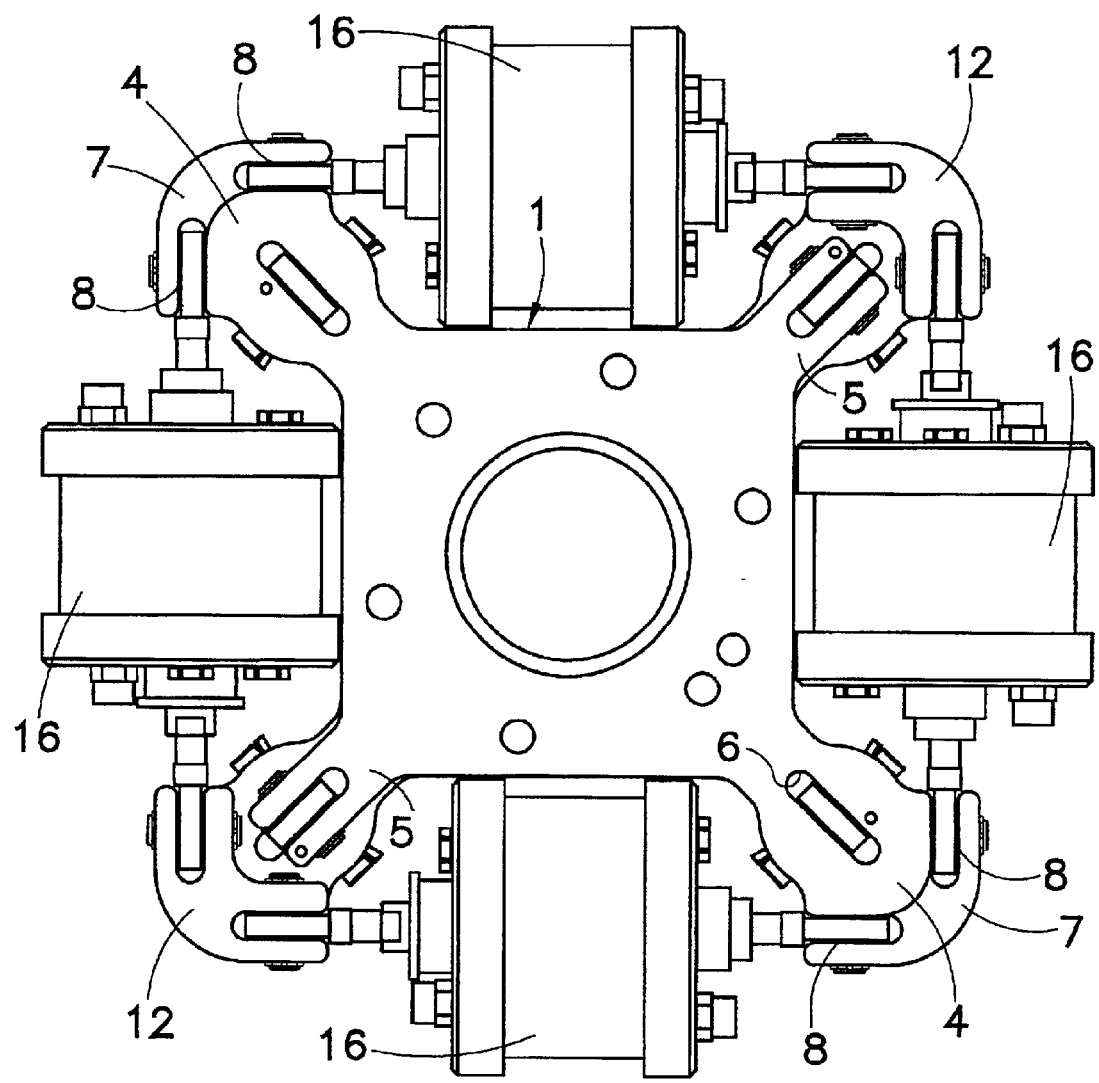
FIG. 3 shows the aforesaid joint in bottom plan as regards FIG. 1.
Figure 6:
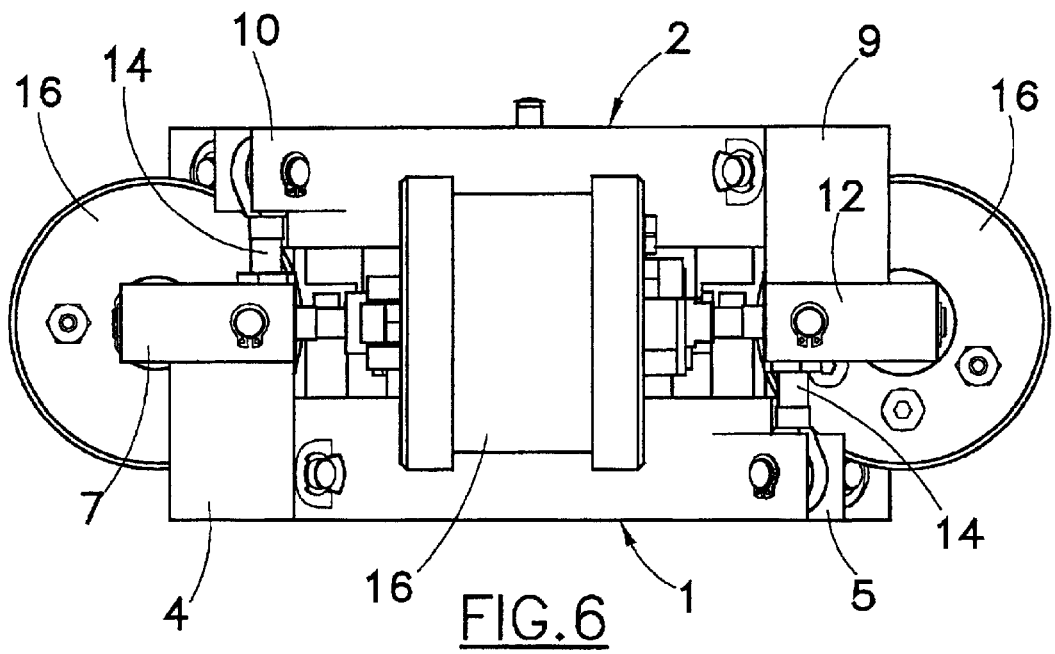
FIG. 6 shows the aforesaid joint in front view.

Column 2, line 25, replace "FIG. 3" with -- FIG. 2 --

Column 2, line 47, insert -- DETAILED DESCRIPTION OF THE INVENTION --

Column 3, line 27, replace "decentralised" with -- decentralized--

Column 3 line 51, replace "decentralised" with -- decentralized--

Column 3 line 52, replace "stabilising" with -- stabilizing --

Column 3, line 61 after "fixed" insert -- stem 23 is fastened whereas from the second one a mobile stem 24 extends --

Column 4, line 20, delete "DETAILED DESCRIPTION OF THE INVENTION"

Column 4, line 48, replace "anthropamorphous" with --anthropomorphous--

Column 4, line 60, replace "and and" with --and--

Column 5, line 2, replace "parallel the lying" -- with parallel to the lying --

Column 6, line 9, replace "decentralised" with -- decentralized--

Signed and Sealed this

Sixteenth Day of January, 2007

JON W. DUDAS
*Director of the United States Patent and Trademark Office*